UNITED STATES PATENT OFFICE.

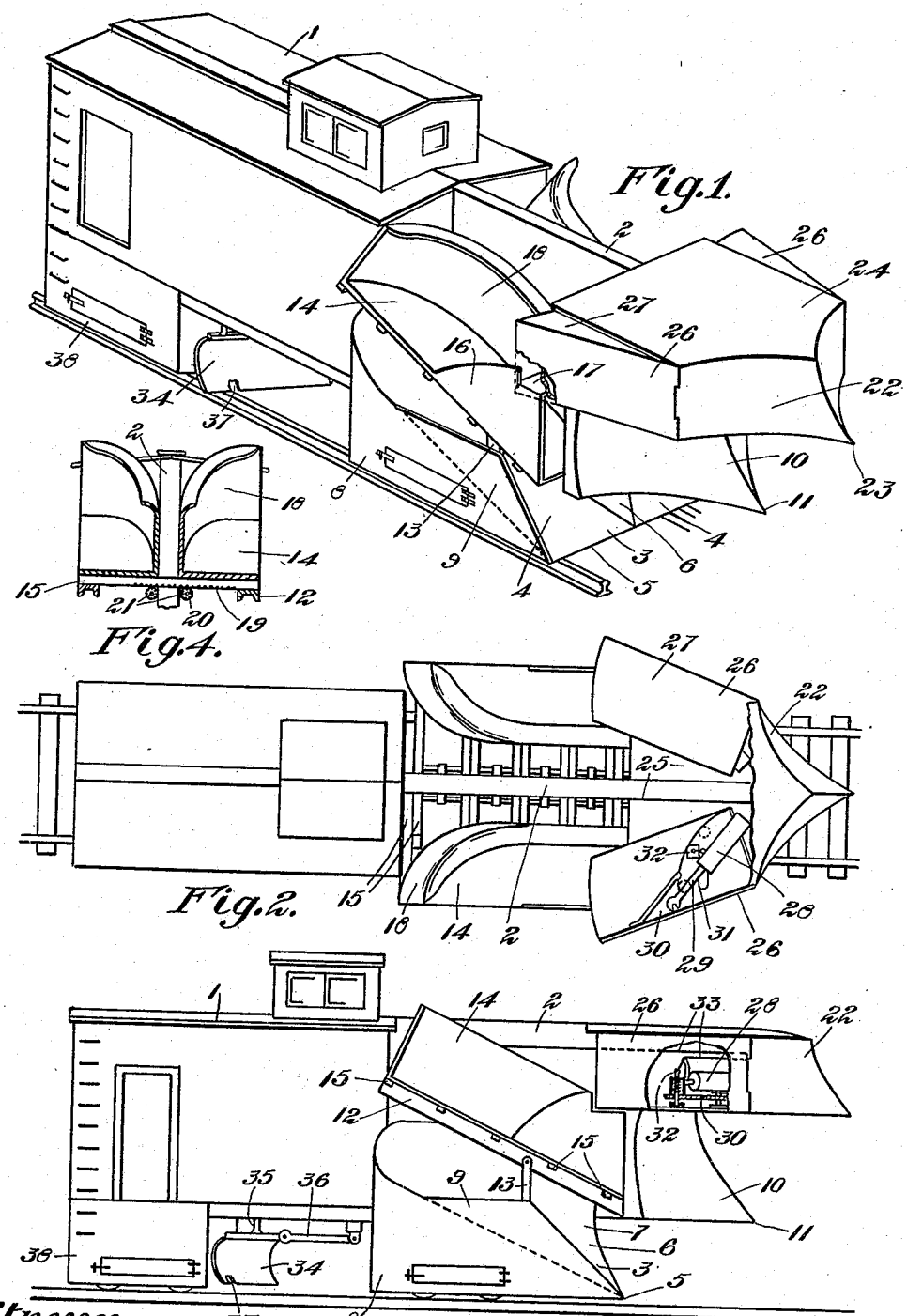

ALFRED DROWLEY AND DONALD D. McLEAN, OF PRICEVILLE, ONTARIO, CANADA.

SNOW-PLOW.

937,428.   Specification of Letters Patent.   Patented Oct. 19, 1909.

Application filed May 24, 1909. Serial No. 497,827.

*To all whom it may concern:*

Be it known that we, ALFRED DROWLEY and DONALD D. McLEAN, both subjects of the King of Great Britain, and residents of Priceville, township of Artemesia, county of Grey, Province of Ontario, in the Dominion of Canada, have invented certain new and useful Improvements in Snow-Plows, of which the following is a specification.

The invention relates to improvements in snow plows, as described in the following specification and illustrated in the accompanying drawings that form part of the same.

The invention consists essentially in the novel construction and arrangement of parts, whereby the snow is cut in successive layers by a plurality of plows arranged one in advance of the other and whereby the snow is cleared from the side of the plow for the deposit of the displaced snow by members extending from the sides of said plows.

The objects of the invention are to facilitate the work of clearing the snow from the railways, and to devise a plow which will clear a passage through the heaviest drifts and discharge the displaced snow so that there will be no danger of the walls of the cut falling in after the plow has cut through.

In the drawings, Figure 1 is a perspective view of my plow partly broken away showing the movable members partly extended. Fig. 2 is a top plan view of the plow partly broken away to disclose the means for operating the movable members of the upper plow. Fig. 3 is a side elevation of the plow showing one of the movable members of the upper plow partly broken away. Fig. 4 is a cross sectional view through the movable members of the middle plow showing the means for moving said members.

Referring to the drawings, 1 is the body of the plow supported on suitable trucks and having the centrally arranged frame work 2 extending forwardly therefrom, said frame work being preferably of steel construction and suitably covered in.

3 is the lower plow extending across the track-way the full width of the body 1 and having the sloping bottoms 4 extending upwardly and rearwardly from the front edge 5.

6 is a divider or ice crusher arranged centrally of the plow 3 and forming part of the frame 2. The plates covering the divider 6 from the sharp edge 7 gradually round off and conform to a scoop shape, forming part of the bottom 4.

8 is an apron preferably formed of steel plate and extending downwardly from the outer sides of the lower plow formed and arranged flush with the side of the body of the plow.

9 is a cutting flange forming part with the apron 8 and extending vertically upward above the bottom of said plow at the outer sides thereof and adapted to cut through the snow and ice so that it will be divided or cut off from the main body forming the drift.

10 is the secondary plow rigidly secured to the forward end of the frame work 2 and arranged with its lower cutting edge considerably in advance of the cutting edge of the lower plow 3. The plow 10 is quite different in form from the plow 3, it having a curved forwardly extending cutting point 11 sloping to the sides, the said plow being the full width of the body 1.

12 are brace beams secured to the back of the plow 10 and extending angularly upward therefrom preferably parallel with the bottom of the lower plow 3 and secured to the body 1 and forming a strong support for the outer sides of the said plow 10.

13 are short braces secured to the brace beams 12 and extending downwardly therefrom and secured to the upwardly projecting corner of the cutting flange 9.

14 are the movable members of the plow 10 formed of suitable plates in the form of a scoop and supported on the adjustable cross beams 15 extending through the frame work 2. The front ends of the members 14 are formed with the side cutting flanges 16 and the top brace portions 17 connecting said side flanges to the inner side walls.

The inner side walls 18 are curved slightly inward at the upper edge and curved outwardly from a point midway of the length of said movable members to the upper edge thereof and conducting the snow cut by the forward edge and also the snow discharged by the plow 10, in an upwardly and outwardly direction.

The members 14 are slidably arranged in their supports and the underside of the cross beams 15 are provided with gear racks 19, said racks being engaged by the gear pinions 20 secured to the shafts 21 extending from the inside of the body of the plow and rotated in any suitable manner. It will thus be seen that the movable members may be moved inwardly or outwardly as desired so as to make varying widths of cuts in the snow.

22 is the upper plow rigidly secured to the frame work 2 and extending forwardly of the plow 10 and formed with a forwardly curved under cutting edge extending to a central point 23.

24 is a hood or top extending from the upper edge of the plow 22 rearwardly to a point slightly back of the back edge of the middle plow 10, the said hood closing in a chamber to each side of the central forwardly extending frame 2.

25 is the base or bottom of the plow 22 preferably formed of stiff steel plates and secured rigidly to said plow and to said central frame.

26 are a pair of wings preferably formed of steel plate and hinged to the outer edge of the plow 22, the said wings having the inwardly bent upper flanged plate 27 extending into the chambers below the hood 24 and forming the protecting coverings to prevent the snow from lodging between the wings and the sides of the hood.

28 are air or steam cylinders pivotally supported on suitable standards rigidly secured within the chambers inclosed by the hood.

29 are piston rods operating in the cylinders 28 and pivotally secured to the inner sides of the wings 26 and adapted to swing said wings on their pivots.

30 are arc shaped plates rigidly secured to the inner walls of the wings 26 and having a circumferential slot 31 therein through which the pivots of the cylinders 28 extend.

32 are spring held bolts secured to the plates 30 and extending downwardly therethrough and adapted to engage a plurality of orifices arranged in the bottom plates 25, said bolts being adapted to lock said wings securely either in an open or closed position and adapted to be raised free of the said wings by means of a cord 33 secured to the upper end thereof and passing through suitable guides to the body portion of the plow.

The wings 26 are arranged to throw the snow cut by the plow 22 a considerable distance to the side and said wings may be swung outwardly so as to clear away any snow cut thereby so that it will not interfere with the proper working of the lower portion of the plow.

34 is a flanger supported beneath the body 1 in front of the rear trucks and adapted to be raised or lowered at will through a suitable mechanism connected to the rods 35 extending upwardly therefrom, said operating mechanism being within the body of the plow.

36 is a pivotal link secured to the forward end of said flanger and to a pivot secured thereto immediately to the rear of the front plow, said link taking the strain off the arms 35 of the said flanger so that the flanger may be raised or lowered very easily.

The flanger 34 is provided with slots 37 cut in the lower edge thereof adapted to receive the rails when the said flanger is in its lowered position, thus allowing the said flanger to cut into and remove the snow or ice between the rails.

38 is an apron covering in the rear trucks of the plow.

In the operation of this device the lower plow is of course much more in use than the upper one as in practice it is made to cut about four feet in height. The snow is cut by the central divider 6 and the side cutting flanges 9 and forced upwardly and backwardly through the scoop shape and discharged outwardly from the side of the plow at a point more than five feet from the top of the rails. The central divider is constructed very strongly and will effectually break any caked snow or ice and the chutes will discharge it clear of the plow.

In the event of the snow being higher than the lower plow, the upper plows cut into it in advance of the said lower plow and if it is high enough to reach the uppermost plow a top layer is cut off by the said upper plow and the side wings are thrown outwardly so that the snow cut by the upper plow will be carried quite clear of the machine. The upper plow is arranged with its lower cutting plow ten feet above the top of the rail, consequently it will be understood that the snow at that height will be generally very light and the wings when extended scrape or clear away the snow to the sides of the plow for a considerable distance.

The second or middle plow following the outer plow cuts away a second layer and when working in a heavy drift the side extensible members 14 are moved outwardly to cut away the snow to the side of the plow 10.

The movable members 14 slope backwardly and upwardly from the cutting edge and carry the snow cut by the plow point, and also cut by themselves, above the level of the bottom of the upper plow, discharging the displaced snow into the cut or channel formed by the extended wings of the upper plow.

The side extensions from the second plow cut away a channel in the snow which receives the discharge from the lower plow, consequently all the snow displaced by the lower plows will be discharged into channels cut by the advance plow with the result that the side of the bank is left sloping away from the track-way thereby providing against the falling in of the banks which is often the case where ordinary plows either of the flange or rotary type are used. The plows cutting one in advance of the other lift the snow in layers; consequently the plow may be forced through the heaviest drifts without very great difficulty; therefore not only is there great saving in power but considerable time will be saved which will be understood is a very valuable consideration to railways and to the public traveling thereon.

The device is very simple and may be easily controlled from the interior of the compartment at the rear of the structure. The means for operating the wings and movable members of the middle plow may be of any desired form and may be very easily controlled.

What we claim as our invention is:—

1. In a snow plow, a plurality of plows arranged one in advance of the other, hinged members secured to the sides of the upper plow adapted to swing outwardly, and adjustable members arranged to move outwardly from the sides of the plow immediately below the upper one.

2. In a snow plow, a plurality of plows arranged one in advance of the other, hinged members secured to the sides of the upper plow adapted to swing outwardly, means for swinging said hinged members, and means for locking said hinged members.

3. In a snow plow, a plurality of plows arranged one in advance of the other, hinged members secured to the sides of the upper plow adapted to swing outwardly, cylinders pivotally supported behind said upper plow having pistons and piston rods operating therein, said piston rods being pivotally connected to said hinged members, and means for locking said hinged members.

4. In a snow plow, a plurality of plows arranged one in advance of the other, hinged members secured to the sides of the upper plow adapted to swing outwardly, said hinged members having plates secured to the inner side thereof, spring held bolts secured to said plates and extending therethrough and entering suitable stop holes arranged therebelow, and means for raising the bolts.

5. In a snow plow, a body portion having a rigid frame work extending forwardly therefrom, a plow member rigidly connected with said rigid frame work and forming a pair of scoops leading upwardly and backwardly from the rails and discharging outwardly at their back ends, a plow member rigidly secured to said frame work above and forward of the aforesaid plow member, a pair of movable scoop members adjustably supported from said frame work behind the latter plow, an upper plow extending forwardly of the aforesaid plow and rigidly supported from said frame and having movable wings secured thereto.

6. In a snow plow, a body portion, a rigid frame work extending forwardly therefrom, a lower plow having chutes discharging from the sides thereof, an upper plow arranged forwardly of said lower plow and supported from said frame work, an intermediately arranged plow extending forwardly of said lower plow and arranged rearwardly of said upper plow, a pair of scoop shaped members slidably supported from said frame and extending upwardly and rearwardly from said intermediate plow, and means for adjusting said adjustable members.

7. In a snow plow, a body portion, a frame work rigidly secured thereto and extending forwardly therefrom, a lower plow discharging from the sides thereof, a plow arranged above said lower plow and extending forwardly thereof, a pair of scoop shaped members arranged back of the latter plow and extending rearwardly and upwardly therefrom and supported on suitable cross bars, means for sliding said cross bars inwardly and outwardly to adjust said movable members, and an upper plow arranged above the aforesaid plows and extending forwardly thereof.

8. In a snow plow, a body portion, a plurality of plows supported from said body portion and arranged in steps, one in advance of the other, and a flanging plow supported from said body behind said plows.

9. In a snow plow, a body portion, a plurality of plows supported from said body portion and arranged in steps, one in advance of the other, a flanging plow supported below said body portion to the rear of said plows and in front of the rear trucks, means for lowering and raising said flanging plow, and a pivotal link secured at one end to said flanging plow and at the other end to the plow body.

Signed at the city of Toronto, in the county of York, Province of Ontario, in the Dominion of Canada, this 10th day of May, 1909.

ALFRED DROWLEY.
DONALD D. McLEAN.

Witnesses:
B. TUCK,
D. S. TORELL.